United States Patent
Ahmed

(10) Patent No.: US 8,606,840 B2
(45) Date of Patent: Dec. 10, 2013

(54) APPARATUS AND METHOD FOR FLOATING-POINT FUSED MULTIPLY ADD

(75) Inventor: Sadar Ahmed, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 938 days.

(21) Appl. No.: 12/726,222

(22) Filed: Mar. 17, 2010

(65) Prior Publication Data
US 2011/0231460 A1  Sep. 22, 2011

(51) Int. Cl.
*G06F 7/38* (2006.01)
(52) U.S. Cl.
USPC ............................................................ 708/523
(58) Field of Classification Search
USPC ............................................................ 708/523
See application file for complete search history.

(56) References Cited

U.S. PATENT DOCUMENTS

| | | | |
|---|---|---|---|
| 5,757,686 A | | 5/1998 | Naffziger et al. |
| 5,796,644 A | * | 8/1998 | Jiang ............................. 708/523 |
| 6,360,189 B1 | * | 3/2002 | Hinds et al. ................... 708/523 |
| 6,542,916 B1 | * | 4/2003 | Hinds et al. ................... 708/523 |
| 8,046,399 B1 | * | 10/2011 | Inaganti et al. ............... 708/523 |
| 2009/0248779 A1 | * | 10/2009 | Brooks et al. ................. 708/523 |

* cited by examiner

*Primary Examiner* — Tan V. Mai
(74) *Attorney, Agent, or Firm* — Osha Liang LLP

(57) ABSTRACT

A fused multiply add (FMA) unit includes an alignment counter configured to calculate an alignment shift count, an aligner configured to align an addend input based on the alignment shift count and output an aligned addend, a multiplier configured to multiply a first multiplicand input and a second multiplicand input and output a product, an adder configured to add the aligned addend and the product and output a sum without determining the sign of the sum or complementing the sum, a normalizer configured to receive the sum directly from the adder and normalize the sum irrespective of the sign of the sum and output a normalized sum, and a rounder configured to round and complement-adjust the normalized sum and output a final mantissa.

19 Claims, 5 Drawing Sheets

Result: F=(AxB)+C

IEEE 754 Floating-Point Data Format:

Double: [Sign] 63 [Exponent Datapath] 62......52 [Mantissa Datapath] 51............0

Single: 31 30......23 22...........0

Floating-Point Multiply-Add Internal Data Format:

Double: [Sign] 63 [Exponent Datapath] 62......52 i [Mantissa Datapath] 51............0

Single: 63 62 60 59.....52 i 51 29 28......[0]

Integer (Signed/Unsigned) Data Format:

Extended Int: 63..................0

Integer: 31..........0

*FIG. 2*

APPARATUS AND METHOD FOR FLOATING-POINT FUSED MULTIPLY ADD

BACKGROUND OF INVENTION

1. Field of the Invention

The invention relates generally to computer processing and, in particular, to an apparatus and method for handling fused multiply add operations.

2. Background Art

To improve floating-point arithmetic processing, most modern processors use a process called the fused-multiply add (FMA) to combine a floating-point multiplication operation and a floating-point addition operation for execution as a single instruction, e.g., (A×B)+C. By performing two operations in a single instruction, the FMA reduces overall execution time and hardware costs. The FMA also provides improved precision because rounding need only be performed after both the multiplication and addition operations are performed at full precision (i.e., there is only one rounding error instead of two). The FMA has set a new trend in processor design, and there is a strong desire to optimize efficiency and performance in FMA architectures.

FIG. 1 shows a general schematic of a conventional FMA architecture for implementing FMA operations. First, a multiplier multiplies the A and B operands and outputs the product in carry-save format, while an aligner aligns the C operand based on the exponent difference of A, B, and C. Then, a 3:2 carry-save adder (CSA), an incrementer, and a carry-propagate adder (CPA) combine the aligned C and the product of A and B to produce an intermediate sum, which a complementer complements as necessary, and a leading zero anticipator (LZA) determines the normalization shift amount. Finally, a normalizer and a rounder normalizes and rounds the result to obtain the final mantissa of the FMA operation. Rounding is performed because the result of floating point operations must conform to a particular data format having a finite number of bits.

The adder output may be either positive or negative. Thus, according to conventional FMA architectures, the adder output goes through a complementer to ensure that a negative output is complemented before the output is normalized and a sticky bit is generated.

SUMMARY OF INVENTION

In general, in one aspect, the invention relates to a fused multiply add (FMA) unit including an alignment counter configured to calculate an alignment shift count, an aligner configured to align an addend input based on the alignment shift count and output an aligned addend, a multiplier configured to multiply a first multiplicand input and a second multiplicand input and output a product, an adder configured to add the aligned addend and the product and output a sum without determining the sign of the sum or complementing the sum, a normalizer configured to receive the sum directly from the adder and normalize the sum irrespective of the sign of the sum and output a normalized sum, and a rounder configured to round and complement-adjust the normalized sum and output a final mantissa.

In general, in another aspect, the invention relates to a processor including an FMA unit, the FMA unit including an alignment counter configured to calculate an alignment shift count, an aligner configured to align an addend input based on the alignment shift count and output an aligned addend, a multiplier configured to multiply a first multiplicand input and a second multiplicand input and output a product, an adder configured to add the aligned addend and the product and output a sum without determining the sign of the sum or complementing the sum, a normalizer configured to receive the sum directly from the adder and normalize the sum irrespective of the sign of the sum and output a normalized sum, and a rounder configured to round and complement-adjust the normalized sum and output a final mantissa.

In general, in another aspect, the invention relates to a method for processing an FMA operation involving an addend, a first multiplicand, and a second multiplicand, the method including calculating an alignment shift count for the addend input, aligning the addend input based on the alignment shift count and outputting an aligned addend, multiplying the first multiplicand input and the second multiplicand input and outputting a product, adding the aligned addend and the product and outputting a sum without determining the sign of the sum or complementing the sum, normalizing the sum irrespective of the sign of the sum and outputting a normalized sum, and rounding and complement-adjusting the normalized sum and outputting a final mantissa.

Other aspects and advantages of the invention will be apparent from the following description and the appended claims.

BRIEF DESCRIPTION OF DRAWINGS

FIG. 2 shows examples of data formats supported by an FMA unit in accordance with one or more embodiments of the present invention.

DETAILED DESCRIPTION

Exemplary embodiments of the invention will be described with reference to the accompanying figures. Like items in the figures are shown with the same reference numbers.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiments of the present invention relate to an apparatus and method for handling fused multiply add (FMA) operations. More specifically, the apparatus and method in accordance with one or more embodiments of the present invention combines two basic operations, addition and multiplication, into a single floating-point FMA operation, e.g., (A×B)+C.

FIG. 2 shows examples of data formats supported by the FMA unit in accordance with one or more embodiments of the present invention. Floating-point data formats supported by embodiments of the present invention have three components: a sign bit representing the sign of the number, an exponent datapath representing the order of magnitude of the number, and a mantissa datapath representing the actual digits of the number. For example, a single-precision float may contain 32 bits (one sign bit, eight exponent bits, and 23 mantissa bits), and a double-precision float may contain 64 bits (one sign bit, 11 exponent bits, and 52 mantissa bits). Integer data formats, which can be converted to floating point, are also supported by one or more embodiments of the present invention. Those skilled in the art will appreciate that embodiments of the present invention may be implemented using other data formats, e.g., the IEEE 854 floating-point standard.

For illustration purposes, implementation of the FMA unit in accordance with one or more embodiments is described below using a particular double-precision floating-point format. The specific number of bits shown in the datapaths are intended to facilitate the description and not to limit the scope of the invention.

Figure 1:
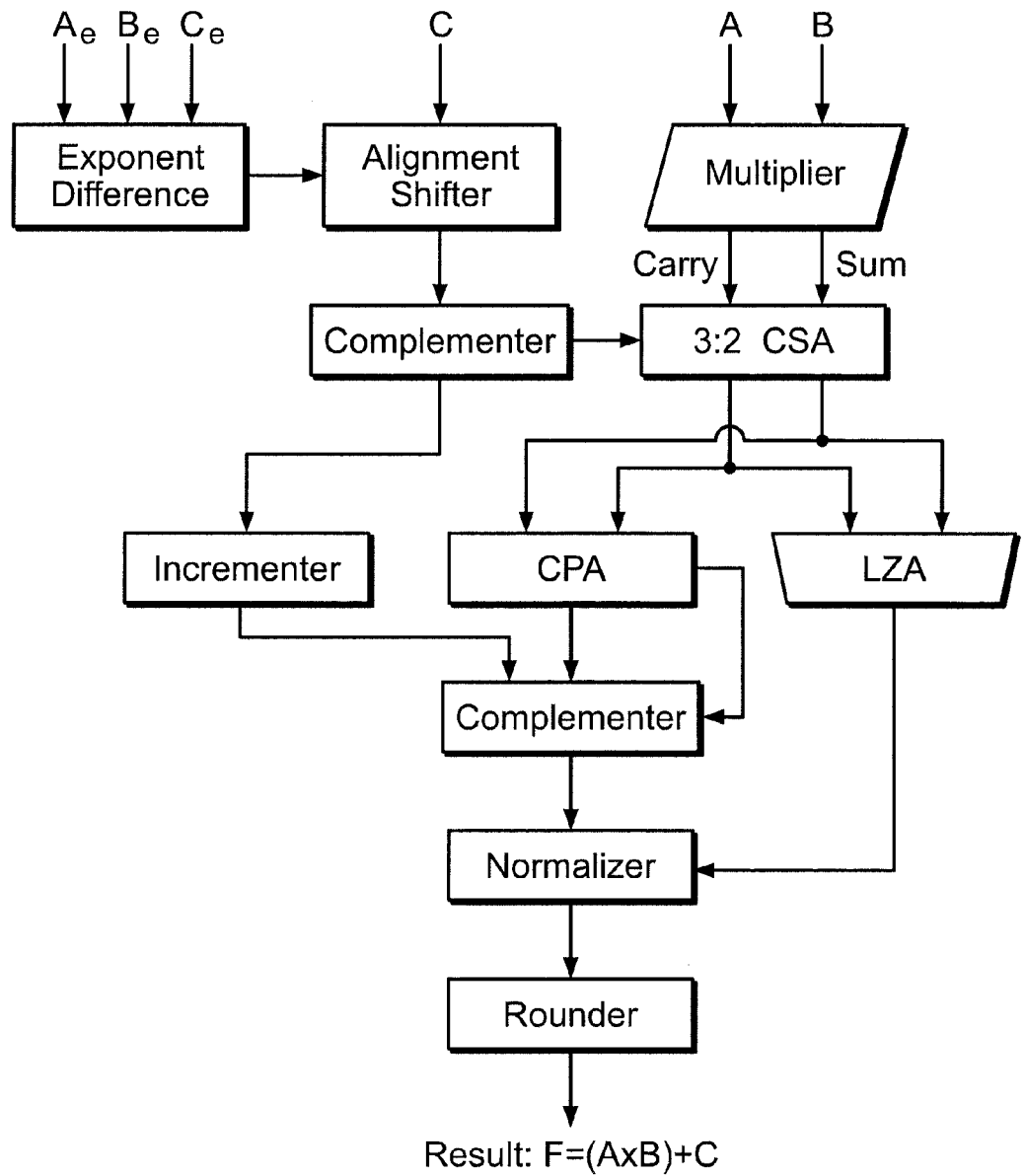
FIG. 1 shows a schematic of a conventional FMA architecture.
Figure 3:
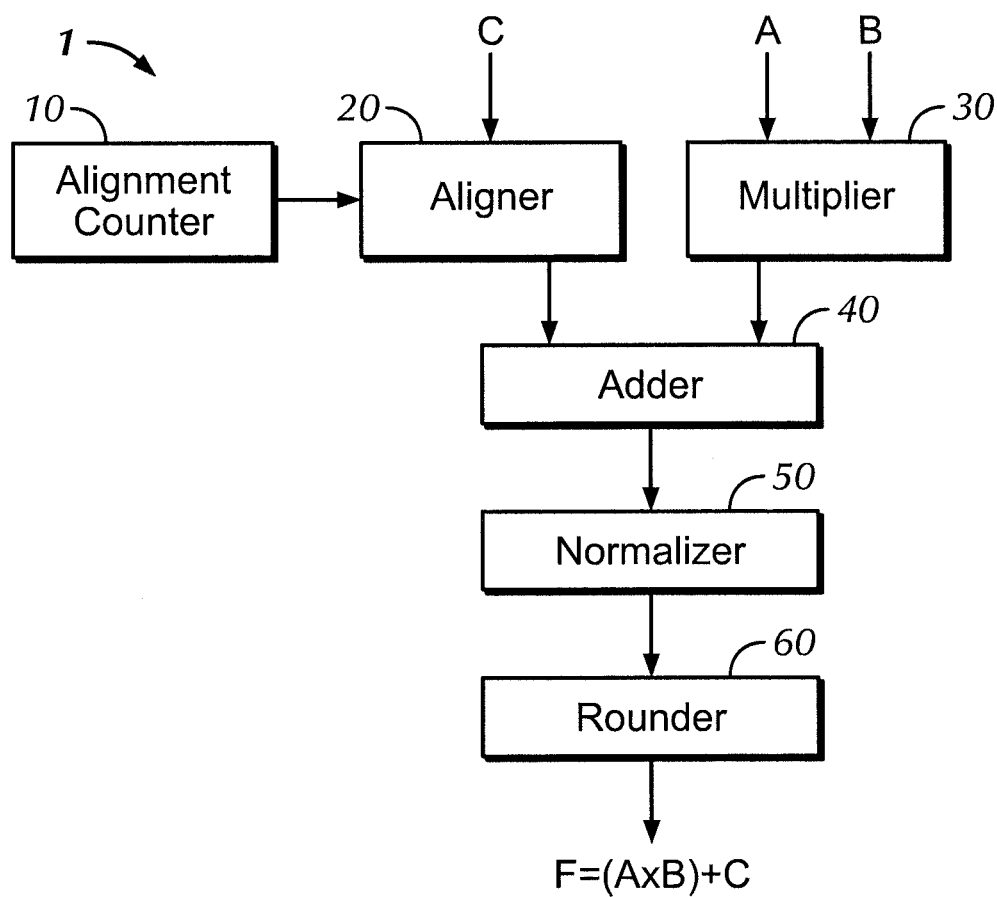
FIG. 3 shows a simplified schematic of an FMA unit in accordance with one or more embodiments of the present invention.
Figure 4:
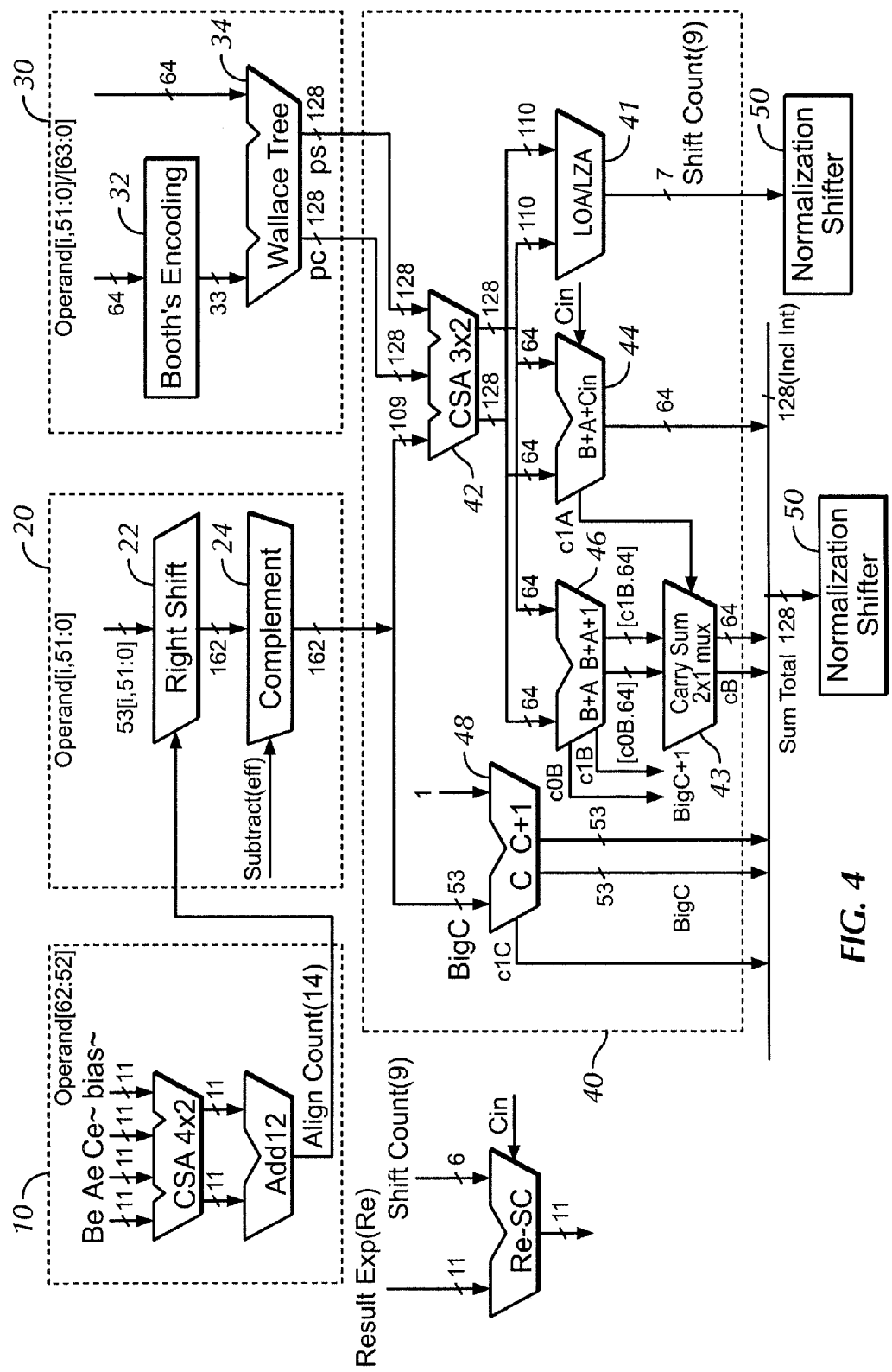
FIG. 4 shows a schematic example of an alignment counter, an aligner, a multiplier, and an adder of the FMA unit shown in FIG. 3.

Referring generally to FIG. 3, an FMA unit 1 in accordance with one or more embodiments includes an alignment counter 10, an aligner 20, multiplier 30, adder 40, a normalizer 50, and a rounder 60. FIG. 4 shows a detailed schematic example of the alignment counter 10, the aligner 20, the multiplier 30, and the adder 40 of the FMA unit 1. The alignment counter 10 calculates the exponent difference of the three input operands A, B, and C, and outputs an align count for the aligner 20. The aligner 20 aligns the C operand using a right shift register 22 and a complementer 24. Specifically, the right shift register 22 shifts the C operand based on the align count so that the C operand is of the same order of magnitude as the product of the A and B operands. The complementer 24 then complements the result as necessary.

While the aligner 20 aligns the C operand, the multiplier 30 multiplies the A and B operands to produce a product. The multiplier 30 may include a Booth encoder 32 for reducing the number of partial products and a Wallace tree multiplier 34 for performing the multiplication. As shown in FIG. 4, the Wallace tree multiplier 34 calculates a 106-bit floating point value or a 128-bit integer value in carry-save format.

Further down the datapath, the adder 40 adds the aligned C operand output from the aligner 20 and the carry-save product of the A and B operands output from the multiplier 30. As shown in FIG. 4, the adder 40 includes a 3:2 carry-save adder (CSA) 42, a carry/sum MUX 43, carry-propagate adders (CPA) 44 and 46, an adder incrementer 48, and a leading zero/one anticipator (LZA) 41. The CSA 42 adds the lower 109 bits of the output of the aligner 20 with the output of the multiplier 30, and produces an intermediate sum in carry-save format.

In one or more embodiments, the output of the aligner 20 is 159 bits (excluding the guard, round, and sticky bits) and the output of the multiplier 30 is 106 bits. Because the upper 53 bits of the aligner 20 are beyond the number of bits in the multiplier output, the upper 53 bits need only go through the adder incrementer 48. Specifically, the adder incrementer 48 receives BigC, which is the upper 53 bits of the output of the aligner 20, and produces two 53-bit outputs BigC and BigC+1 and a carry-out bit c1C.

The CPAs 44 and 46 add the sum and carry bits of the A and B operands output from the CSA 42, and produce a sum total. Specifically, the CPA 44 calculates the sum of A, B, and a carry-in bit cin, and produces a 64-bit sum along with a carry-out bit c1A, while the CPA 46 calculates B+A and B+A+1 and provides the results to the carry/sum MUX 43. The carry/sum MUX 43 produces a 64-bit output, along with a carry-out bit cB, based on the carryout bit c1A from the CPA 44. Further, the LZA 41 predicts the leading zeroes/ones of the sum and carry outputs from the CSA 42, and outputs a normalization shift count SC for normalizing the adder output. Those skilled in the art will recognize that two or more of the aforementioned processes in the adder 40 may be implemented in parallel.

Figure 5:
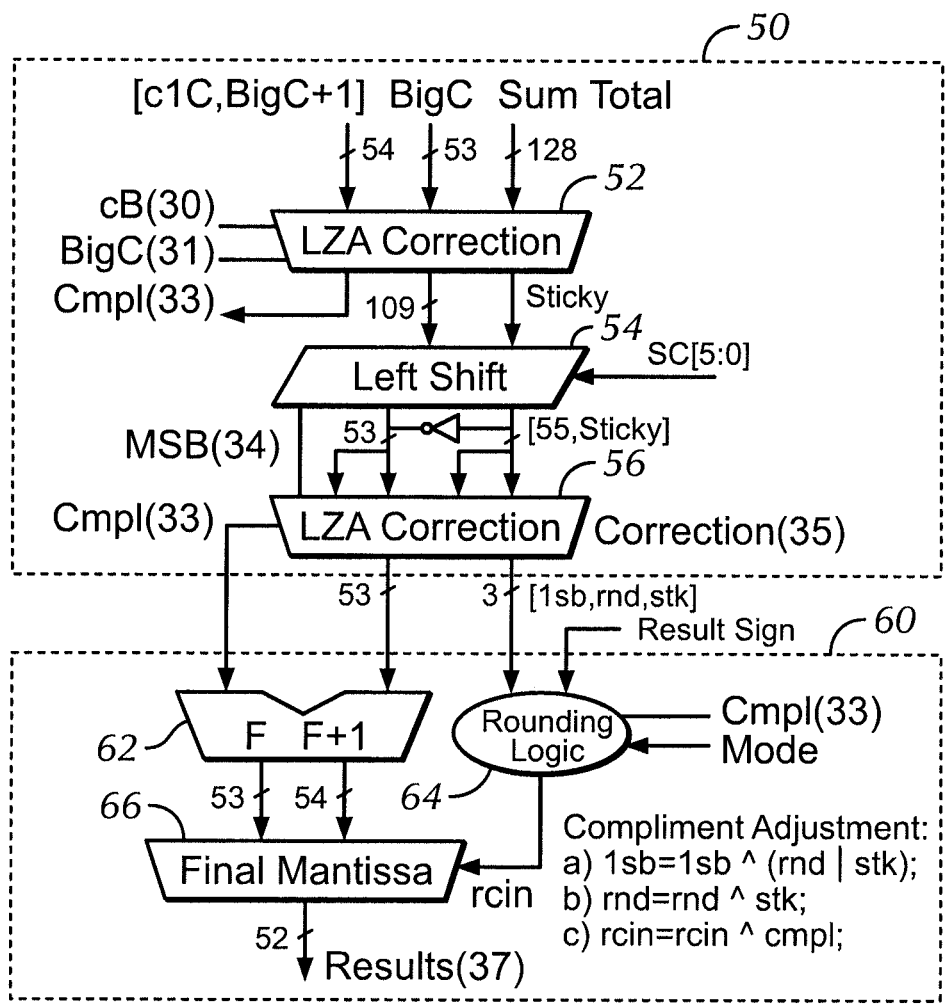
FIG. 5 shows a schematic example of a normalizer and a rounder of the FMA unit shown in FIG. 3.

Next, as shown in FIG. 5, the normalizer 50 receives the outputs from the CPAs 44 and 46 and the adder incrementer 48, and normalizes the adder output based on the normalization shift count SC output from the LZA 41. The sign need not be immediately determined after the adding stage, but rather before the LZA correction stage as discussed below. Specifically, the FMA unit 1 does not make a distinction between a positive adder output or a negative adder output, and the normalizer 50 is configured to treat both the negative and positive adder outputs uniformly.

As shown in FIG. 5, the normalizer 50 includes a normalizer MUX 52, left shift register 54, and an LZA correction MUX 56. The normalizer MUX 52 receives the sum total output from the CPAs 44 and 46 as well as the 53-bit and 54-bit outputs from the adder incrementer 48, and produces a 109-bit intermediate normalized sum, a sticky bit, and a complement signal Cmpl indicating whether the result should be complemented. The output of the normalizer MUX 52 is controlled by the BigC signal, which is determined during the aligning stage. The left shift register 54 shifts the 109-bit intermediate normalized sum based on the normalization shift count SC, and produces a second intermediate normalized sum. The second intermediate normalized sum and its complement are fed into the LZA correction MUX 56, and the sign of the second intermediate normalized sum is communicated to the LZA correction MUX 56. The complement signal Cmpl determines the output of the LZA correction MUX 56 (if the complement signal Cmpl is asserted, the LZA correction MUX 56 looks for a 1, and otherwise a 0).

Then, the normalized sum is input to the rounder 60 for rounding and complement adjustment. The rounder 60 includes a rounder incrementer 62, a rounding logic circuit 64, and a final mantissa MUX 66. The rounder incrementer 62 increments the normalized sum from the LZA correction MUX 56 in case it is a negative number. Subsequently or concurrently, based on the complement signal Cmpl, the rounding logic circuit 64 performs rounding and complement-adjustment on the least significant bit lsb, the round bit rnd, and the carry-in control signal rcin of the normalized sum, and produces a carry-in control signal (rein) for the final mantissa MUX 66. The rounding and complement adjustment may be performed as shown in the equations under "Complement Adjustment" in FIG. 5, where the symbol "^" denotes a logical XOR operation and the "|" symbol denotes a logical OR operation. Finally, based on the carry-in control signal rcin, the final mantissa MUX 66 selects the final result and places it in a target floating point register. Although not shown in the figures, a post-normalization process may be performed on the final result if necessary.

Those skilled in the art will appreciate many variations to the implementation described above that are within the spirit of the invention. Advantages of embodiments of the present invention may include one or more of the following.

According to one or more embodiments, floating-point FMA operations can be performed without complementing the adder output prior to the normalizing stage of the FMA datapath. Rather, the adder output can be fed directly to the normalizer for normalization and sticky bit generation. In other words, the FMA unit in accordance with one or more embodiments is configured to treat both the negative and positive adder outputs uniformly at the normalizing stage, and no distinction is made between a positive adder output and a negative adder output. Thus, the FMA unit in accordance with one or more embodiments does not need to generate multiple adder outputs, and can handle negative adder outputs more efficiently than conventional FMA architectures.

According to one or more embodiments of the present invention, the sign of the adder output can be determined prior to the LZA correction stage, and the complementing can be performed by a simpler complement adjustment logic at the rounding stage of the FMA operation. Thus, one or more embodiments of the present invention eliminates the additional logic at the adding stage required to determine whether the adder output must be complemented. Further, according to one or more embodiments, the rounding and complementing by the rounding logic circuit are mutually exclusive, and a simple adjustment can accomplish the inversion or rounding. By eliminating the complementing logic from the critical path of the adding stage, which may require hundreds of flops, multiplexers and other logic gates, a significant amount of hardware can be removed from the FMA unit. Thus, the FMA unit according to one or more embodiments improves overall system efficiency and performance by speeding up processing time and reducing hardware and power consumption.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A fused multiply add (FMA) unit comprising:
an alignment counter configured to calculate an alignment shift count;
an aligner configured to align an addend input based on the alignment shift count and output an aligned addend;
a multiplier configured to multiply a first multiplicand input and a second multiplicand input and output a product;
an adder configured to add the aligned addend and the product and output a sum without determining the sign of the sum and without complementing the sum;
a normalizer configured to receive the sum directly from the adder and normalize the sum irrespective of the sign of the sum and output a normalized sum; and
a rounder configured to round and complement-adjust the normalized sum and output a final mantissa.

2. The FMA unit according to claim 1, wherein the adder comprises:
a carry-save adder configured to add the aligned addend and the product and output an intermediate sum in carry-save format including a sum portion and a carry portion;
one or more carry-propagate adders configured to add the sum portion and a carry portion of the intermediate sum and output the sum; and
an adder incrementer configured to increment upper bits of the aligned addend beyond the number of bits of the product and output the upper bits of the aligned addend and incremented upper bits of the aligned addend.

3. The FMA unit according to claim 2, wherein the adder further comprises a leading zero/one anticipator configured to predict a number of leading zeroes/ones of the intermediate sum and output a normalization shift count to the normalizer.

4. The FMA unit according to claim 3, wherein the normalizer comprises:
a normalizer multiplexer configured to receive the sum and output a first intermediate normalized sum;
a shift register configured to shift the first intermediate normalized sum based on the normalization shift count and output a second intermediate normalized sum; and
a leading zero/one anticipator correction multiplexer configured to correct, if necessary, the number of leading zeroes/ones predicted by the leading zero/one anticipator.

5. The FMA unit according to claim 3, wherein the adder incrementer outputs the upper bits of the aligned addend and the incremented upper bits of the aligned addend to the normalizer.

6. The FMA unit according to claim 5, wherein the one or more carry-propagate adders and the adder incrementer output a plurality of carry-out bits to the normalizer.

7. The FMA unit according to claim 6, wherein the normalizer comprises:
a normalizer multiplexer configured to receive the sum, the upper bits of the aligned addend, the incremented upper bits of the aligned addend, and the plurality of carry-out bits and output a first intermediate normalized sum and a complement signal;
a shift register configured to shift the first intermediate normalized sum based on the normalization shift count and output a second intermediate normalized sum; and
a leading zero/one anticipator correction multiplexer configured to determine whether the number of leading zeroes/ones predicted by the leading zero/one anticipator is correct and output the normalized sum and a corrected least significant bit, round bit, and sticky bit of the normalized sum.

8. The FMA unit according to claim 7, wherein the rounder comprises:
a rounder incrementer configured to increment the normalized sum and output the normalized sum and an incremented normalized sum;
a rounding logic circuit configured to adjust the corrected least significant bit, round bit, and sticky bit, and output a carry-in bit; and
a final mantissa multiplexer configured to receive the normalized sum and the incremented normalized sum and output the final mantissa based on the carry-in bit.

9. The FMA unit according to claim 1, wherein the adder comprises a plurality of logic units configured to add the aligned addend and the product and output the sum to the normalizer without determining the sign of the sum or complementing the sum, the plurality of logic units consisting of:
a carry-save adder;
two carry-propagate adders;
a leading zero/one anticipator;
an incrementer; and
a multiplexer.

10. A processor comprising a fused multiply add (FMA) unit, wherein the FMA unit comprises:
an alignment counter configured to calculate an alignment shift count;
an aligner configured to align an addend input based on the alignment shift count and output an aligned addend;
a multiplier configured to multiply a first multiplicand input and a second multiplicand input and output a product;
an adder configured to add the aligned addend and the product and output a sum without determining the sign of the sum and without complementing the sum;
a normalizer configured to receive the sum directly from the adder and normalize the sum irrespective of the sign of the sum and output a normalized sum; and a rounder configured to round and complement-adjust the normalized sum and output a final mantissa.

11. The processor according to claim 10, wherein the adder comprises:
   a carry-save adder configured to add the aligned addend and the product and output an intermediate sum in carry-save format including a sum portion and a carry portion;
   one or more carry-propagate adders configured to add the sum portion and a carry portion of the intermediate sum and output the sum; and
   an adder incrementer configured to increment upper bits of the aligned addend beyond the number of bits of the product and output the upper bits of the aligned addend and incremented upper bits of the aligned addend.

12. The processor according to claim 11, wherein the adder further comprises a leading zero/one anticipator configured to predict a number of leading zeroes/ones of the intermediate sum and output a normalization shift count to the normalizer.

13. The processor according to claim 12, wherein the normalizer comprises:
   a normalizer multiplexer configured to receive the sum and output a first intermediate normalized sum;
   a shift register configured to shift the first intermediate normalized sum based on the normalization shift count and output a second intermediate normalized sum; and
   a leading zero/one anticipator correction multiplexer configured to correct, if necessary, the number of leading zeroes/ones predicted by the leading zero/one anticipator.

14. The processor according to claim 12, wherein the adder incrementer outputs the upper bits of the aligned addend and the incremented upper bits of the aligned addend to the normalizer.

15. The processor according to claim 14, wherein the one or more carry-propagate adders and the adder incrementer output a plurality of carry-out bits to the normalizer.

16. The processor according to claim 15, wherein the normalizer comprises:
   a normalizer multiplexer configured to receive the sum, the upper bits of the aligned addend, the incremented upper bits of the aligned addend, and the plurality of carry-out bits and output a first intermediate normalized sum and a complement signal;
   a shift register configured to shift the first intermediate normalized sum based on the normalization shift count and output a second intermediate normalized sum; and
   a leading zero/one anticipator correction multiplexer configured to determine whether the number of leading zeroes/ones predicted by the leading zero/one anticipator is correct and output the normalized sum and a corrected least significant bit, round bit, and sticky bit of the normalized sum.

17. The processor according to claim 16, wherein the rounder comprises:
   a rounder incrementer configured to increment the normalized sum and output the normalized sum and an incremented normalized sum;
   a rounding logic circuit configured to adjust the corrected least significant bit, round bit, and sticky bit, and output a carry-in bit; and
   a final mantissa multiplexer configured to receive the normalized sum and the incremented normalized sum and output the final mantissa based on the carry-in bit.

18. The processor according to claim 10, wherein the adder comprises a plurality of logic units configured to add the aligned addend and the product and output the sum to the normalizer without determining the sign of the sum or complementing the sum, the plurality of logic units consisting of:
   a carry-save adder;
   two carry-propagate adders;
   a leading zero/one anticipator;
   an incrementer; and
   a multiplexer.

19. A method for using a processor to process a fused-multiply add (FMA) operation involving an addend, a first multiplicand, and a second multiplicand, the method comprising:
   calculating an alignment shift count for the addend input;
   aligning the addend input based on the alignment shift count and outputting an aligned addend;
   multiplying the first multiplicand input and the second multiplicand input and outputting a product;
   adding the aligned addend and the product and outputting a sum without determining the sign of the sum and without complementing the sum;
   normalizing the sum irrespective of the sign of the sum and outputting a normalized sum; and
   rounding and complement-adjusting the normalized sum and outputting a final mantissa.

* * * * *

UNITED STATES PATENT AND TRADEMARK OFFICE
CERTIFICATE OF CORRECTION

PATENT NO. : 8,606,840 B2  
APPLICATION NO. : 12/726222  
DATED : December 10, 2013  
INVENTOR(S) : Ahmed Page 1 of 1

It is certified that error appears in the above-identified patent and that said Letters Patent is hereby corrected as shown below:

In the Specification

In column 4, line 43, delete "(rein)" and insert -- (rcin) --, therefor.

Signed and Sealed this
Eighth Day of July, 2014

Michelle K. Lee
*Deputy Director of the United States Patent and Trademark Office*